US009703803B2

(12) United States Patent
Bachar et al.

(10) Patent No.: US 9,703,803 B2
(45) Date of Patent: *Jul. 11, 2017

(54) REPLICA IDENTIFICATION AND COLLISION AVOIDANCE IN FILE SYSTEM REPLICATION

(71) Applicant: INTERNATIONAL BUSINESS MACHINES CORPORATION, Armonk, NY (US)

(72) Inventors: Yariv Bachar, Ma'abarot (IL); Aviv Caro, Modiin (IL); Asaf Levy, Rishon le Zion (IL); Oded Sonin, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,804

(22) Filed: Mar. 22, 2016

(65) Prior Publication Data
US 2016/0203161 A1    Jul. 14, 2016

Related U.S. Application Data

(63) Continuation of application No. 13/489,386, filed on Jun. 5, 2012, now Pat. No. 9,305,004.

(51) Int. Cl.
*G06F 17/30* (2006.01)

(52) U.S. Cl.
CPC .... *G06F 17/30218* (2013.01); *G06F 17/3012* (2013.01); *G06F 17/30117* (2013.01); *G06F 17/30215* (2013.01)

(58) Field of Classification Search
CPC .......... G06F 17/3012; G06F 17/30218; G06F 17/30117; G06F 17/30215
See application file for complete search history.

(56) References Cited

U.S. PATENT DOCUMENTS

| 6,260,120 B1 | 7/2001 | Blumenau et al. |
| 6,542,907 B1 | 4/2003 | Cohen |

(Continued)

FOREIGN PATENT DOCUMENTS

| CN | 101997823 A | 8/2009 |
| CN | 101692239 A | 4/2010 |

OTHER PUBLICATIONS

Akturk, "Asynchronous Replication of Metadata Across Multi-Master Servers in Distributed Data Storage Systems," Dogus University, Dec. 2009 (70 pages).

(Continued)

*Primary Examiner* — Leslie Wong
(74) *Attorney, Agent, or Firm* — Griffiths & Seaton PLLC

(57) ABSTRACT

A unique file-system node identification (ID) is created for each newly created node in a file system repository by combining a grid identification (ID), a repository identification (ID), and a node identification (ID) to form the unique file-system node ID. The unique file-system node ID is associated with a unique association identification (ID) thereby linking the node from a source repository to a target repository to form an association when performing a replication operation between the source repository and the target repository. Upon removing the association, the unique association ID is unlinked from a replication policy in a source repository, where an initiated replication operation is disabled.

21 Claims, 4 Drawing Sheets

(56) References Cited

U.S. PATENT DOCUMENTS

| | | | |
|---|---|---|---|
| 6,920,469 B2 | 7/2005 | Cooke et al. | |
| 6,934,723 B2 | 8/2005 | Breiter et al. | |
| 7,243,103 B2 | 7/2007 | Murphy et al. | |
| 7,836,017 B1 | 11/2010 | Srinivasan et al. | |
| 8,086,661 B2 | 12/2011 | Holenstein et al. | |
| 8,850,130 B1 * | 9/2014 | Aron | G06F 9/52 |
| | | | 711/150 |
| 2003/0140051 A1 | 7/2003 | Fujiwara et al. | |
| 2004/0172421 A1 | 9/2004 | Saito et al. | |
| 2005/0251538 A1 | 11/2005 | Cooke et al. | |
| 2006/0089936 A1 | 4/2006 | Chalker | |
| 2007/0094312 A1 | 4/2007 | Sim-Tang | |
| 2009/0271412 A1 * | 10/2009 | Lacapra | G06F 17/30206 |
| 2010/0114889 A1 * | 5/2010 | Rabii | G06F 17/30197 |
| | | | 707/737 |
| 2011/0040728 A1 | 2/2011 | Akirav et al. | |
| 2011/0252124 A1 | 10/2011 | Bonner et al. | |
| 2012/0017037 A1 * | 1/2012 | Riddle | G06F 17/30519 |
| | | | 711/103 |

OTHER PUBLICATIONS

Shen, "An Efficient and Adaptive Decentralized File Replication Algorithm in P2P File Sharing Systems," IEEE Computer Society, IEEE Transactions on Parallel and Distributed Systems, vol. 21, No. 6, Jun. 2010 (14 pages).

WuHengKui, "Key Technologies Research on DHT-based Identifier Mapping in Universal Network," Beijing Jiaotong University, Jan. 5, 2012 (2 pages).

"The Design and Implementation of File Matching Method in Data Backup & Recovery System," Jun. 15, 2008 (1 page).

* cited by examiner

THE STRUCTURE OF THE *fs-node-id*

REPLICA IDENTIFICATION AND COLLISION AVOIDANCE IN FILE SYSTEM REPLICATION

CROSS REFERENCE TO RELATED APPLICATIONS

This application is a Continuation of U.S. patent application Ser. No. 13/489,386, filed on Jun. 5, 2012.

FIELD OF THE INVENTION

The present invention relates generally to computers, and more particularly, to replica identification and collision avoidance in file system replication.

DESCRIPTION OF THE RELATED ART

In today's society, computer systems are commonplace. Computer systems may be found in the workplace, at home, or at school. Computer systems may include data storage systems, or disk storage systems, to process and store data. One such process is data replication. Replicated data systems may externalize various logical data storage entities, such as files, data objects, backup images, data snapshots or virtual tape cartridges. One type of replication is file system replication. File system replication involves maintaining a copy (replica) of a file on a remote storage that may be updated locally. Despite many benefits offered from file system replication, there are accompanying limitations that negatively affect replication efficiency, system performance, data consistency, and additional challenges.

SUMMARY OF THE INVENTION

File-system replication is the process of replicating files, directories and file-systems at a logical level, rather than replicating at the storage block level. Similar to block-level storage replication, file-system replication can be either synchronous or asynchronous. In synchronous mode, file-system operations at the source repository are blocked until the target repository has acknowledged a successful replication. In asynchronous mode, the file-system's operations, contents, and structure are replicated in parallel with changes taking place in the source repository of the file system.

As such, a need exists for a global unique identification so that each repository may distinguish other repositories data structures, files, and/or objects as compared to the repositories own generated data structures, files, and/or objects when a replication operation is performed to other repositories (in a grid/repository environment). In other words, the file system replication operations need to be able to identify the origin of each object. However, when multiple copies of a file-system node are replicated between repositories that merely identify the origin of the object, such action may be insufficient since the target repository must be capable of discriminating between multiple copies of the same object in the target repository.

Also, a need exists for a solution for discriminating between multiple copies of the same object in the target repository and also for providing a global unique identification. Moreover, a need exists for an additional association on the replicated structural identification of the file-system nodes rather than generating a new and different unique ID for the file-system node replication in the target that could both differentiate but will lose the association to the original node in the source repository. Thus, the file-system replication maintains the ability to compare the same node name and structure between the source and the target repositories.

Accordingly, and in view of the foregoing, various exemplary method, system, and computer program product embodiments for replica identification and collision avoidance in a file-system replication system in a computing environment are provided. In one embodiment, by way of example only, a unique file-system node identification (ID) is created for each newly created node in a file system repository by combining a grid identification (ID), a repository identification (ID), and a node identification (ID) to form the unique file-system node ID. The unique file-system node ID is associated with a unique association identification (ID) thereby linking the node from a source repository to a target repository to form an association when performing a replication operation between the source repository and the target repository. Upon removing the association, the unique association ID is unlinked from a replication policy in a source repository, where an initiated replication operation is disabled.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
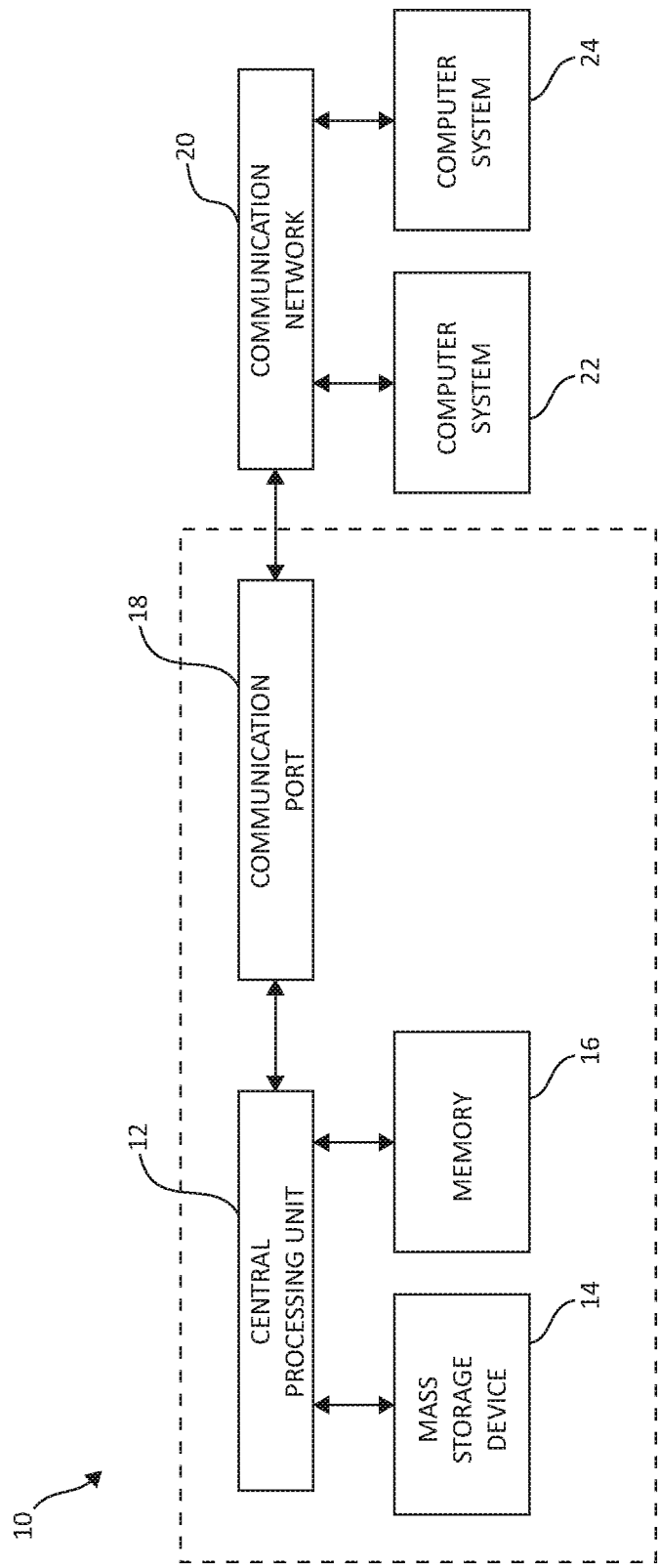
FIG. 1 is a block diagram illustrating a computing system environment having an example storage device in which aspects of the present invention may be realized.

As mentioned previously, file-system replication means replicating files, directories and file-systems at a logical level rather than replicating files at the storage block level. Similarly to block-level storage replication, file-system replication can be either synchronous or asynchronous. In synchronous mode, file-system operations at the source repository are blocked until the target repository has acknowledged their successful replication. In an asynchronous mode, a file-system's operations, contents, and structure are replicated in parallel to the changes taking place in the source repository.

File-system replication systems may yield several benefits. First, since data is captured at the node (e.g., file or directory) level it can make an informed decision on whether to replicate based on the node's attributes (e.g. file type, location, etc.). Thus, unlike block-level storage replication, in which entire volumes need to be replicated, file-system replication systems have the ability to exclude temporary files or sections of the file-system that have no value. Moreover, such file-systems can leverage file data deduplication, since the file-system replication is aware of logical level context. This substantially reduces the bandwidth of the replication as well as decreases the storage capacities on the target repositories.

In one implementation, the file-systems' design provides a clear separation between structure and namespace and the storage or data represented at the block level usually by some form of IDs (e.g. inodes in most UNIX file-systems). In the local repository's file-system, this separation is enough to identify file-system objects (nodes), such as directories and files, because the names are unique, and as such, the location in the file-system structure is uniquely identified. Moreover, the data (block) level of the object is uniquely identified by keeping the node identification's (ID) unique.

However, in the context of file-system replication, this local identification is not enough for global replica identification and collision avoidance within a repository and/or grid. If a global unique identification exits, then each repository can distinguish other repositories received objects from the repositories own generated objects. In other words, the system can identify the origin of each object. In order to address the challenge for global replica identification and collision avoidance within a repository and/or grid, in one embodiment, a repository is created independently of the grids. A grid identification (ID) is computed for the grid. In one embodiment, the computation may be performed by incrementing the value of the grid ID variable maintained by a software entity that corresponds to a grid set (denoted as a grid set manager) and facilitates generation of grids within that grid set. Alternatively, a unique grid ID may be assigned. The repository may subsequently be assigned to a grid, and further migrated between grids in the same grid set (at any given time a repository may be associated with a single grid). Upon assignment of a repository to a grid, the repository is assigned with a unique "repository identification (ID)" computed by incrementing the value of a repository ID variable maintained by a software entity, which corresponds to a grid (denoted as a grid manager) and facilitates affiliation of repositories to that grid. Alternatively, the user may assign a unique repository ID.

However, if a global, unique file-system node identification (ID) exits, then each repository can distinguish between Objects received from other repositories as well as the repositories own generated objects. In other words, the file-system repository allows for the identification of the origin of each object. However, when multiple copies of a file-system node are replicated between repositories, global unique identification is insufficient, since the target repository must be capable of discriminating between multiple copies of the same object that are within the target repository. In other words, the target system/repository should be able to discriminate multiple copies of the same object within the target repository in addition to discriminating objects in between repositories within the grid. For example, consider replicating the same node (e.g. file) from repository "S" to repository "D", but to different target directories. The local identification will not satisfy the need to discriminate within repository D, as both instances will carry the same identification (ID) value. In replication to other repositories (e.g., repositories in a grid environment) there is a need for a global unique file system node identification (ID) so that each repository can distinguish between objects received from other repositories and objects generated from the local (and/or source) repository. In other words, the file-system replication system can distinguish between objects received from other repositories and objects generated from the local repository.

In order to distinguish multiple copies of the same object received from a source repository, as mentioned above, the file-system replication system requires additional information that will provide a differentiation on top of the global (grid-wide) identification. Instead of generating a new and different unique ID for the file-system node replication in a target repository, which could differentiate but lose the association to the origin node in the source repository, an additional association on the replicated structural identification of the file-system nodes is provided. Thus, the embodiments of file-system replication provide for the ability to compare the same node's name and structure between the source and the target repositories.

Furthermore, file-system replication systems need to maintain consistency of structure and data. In other words, the consistency of structure and data refers to the synchronization between file-system structures and the file-system replication systems' replicas at the target repository beyond the data consistency. In order to achieve consistency of structure and data, in the complex domain of file-system operations (e.g. rename, attribute change, restructuring), the replication system must enforce ordering during replication procedures. Thus, the replication procedures must reflect changes in a file-system's structure at the target repository in the order (or sequence) in which the changes were performed in the source repository. Moreover, when initiating a new replication association between the source and target repositories, or adding new file-system nodes to the association's supervision, the association may become unsynchronized, as only new operations on the nodes are sent to the target. Thus, these systems must be able to efficiently verify which file-system structures are indeed synchronized or unsynchronized, and minimize disruption to normal file-system operations and/or the replication procedure.

The mechanisms of the illustrated embodiments seek to provide a solution for efficient replica identification and collision avoidance mechanism in file-system replication. The illustrated embodiments address the following aspects of efficient replication for identification and collision avoidance. (1) The illustrated embodiments provide efficient discrimination between different replicas of the same node within a destination repository (e.g., target repository) thereby avoiding collisions. (2) The illustrated embodiments provide efficient detection of replicas' synchronization within the association. In other words, providing efficient detection of replicas' synchronization without the need of data or structure verification between the original and replication objects. (3) The illustrated embodiments ensure absolute identity (synchronization) between the original and replication nodes. In other words, the probability for a difference between the source and target copies should be zero. (4) The illustrated embodiments provide procedures for replica identification and collision avoidance that are independent of the replication procedures and/or file-system layout and implementation. Thus, replicas are identified, the replica synchronization is verified with the original copies, and collisions are avoided for efficient replication.

The software entities as described above that correspond to a grid set, a grid, a repository, and unique filesystem node identification may be implemented, as one skilled in the art will anticipate. For example, a particular software entity may be referred to as a "grid manager." The grid manager software may assist in managing the various identifications described above. For example, the grid manager may perform a determination as to whether a particular grid ID has been assigned, and assign the grid ID to a new grid. Similarly, the grid manager or other software entity may manage and assign repository ID's and the unique filesystem node ID. The grid manager software may be implemented in conjunction with other storage management software, again as one skilled in the art would expect.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
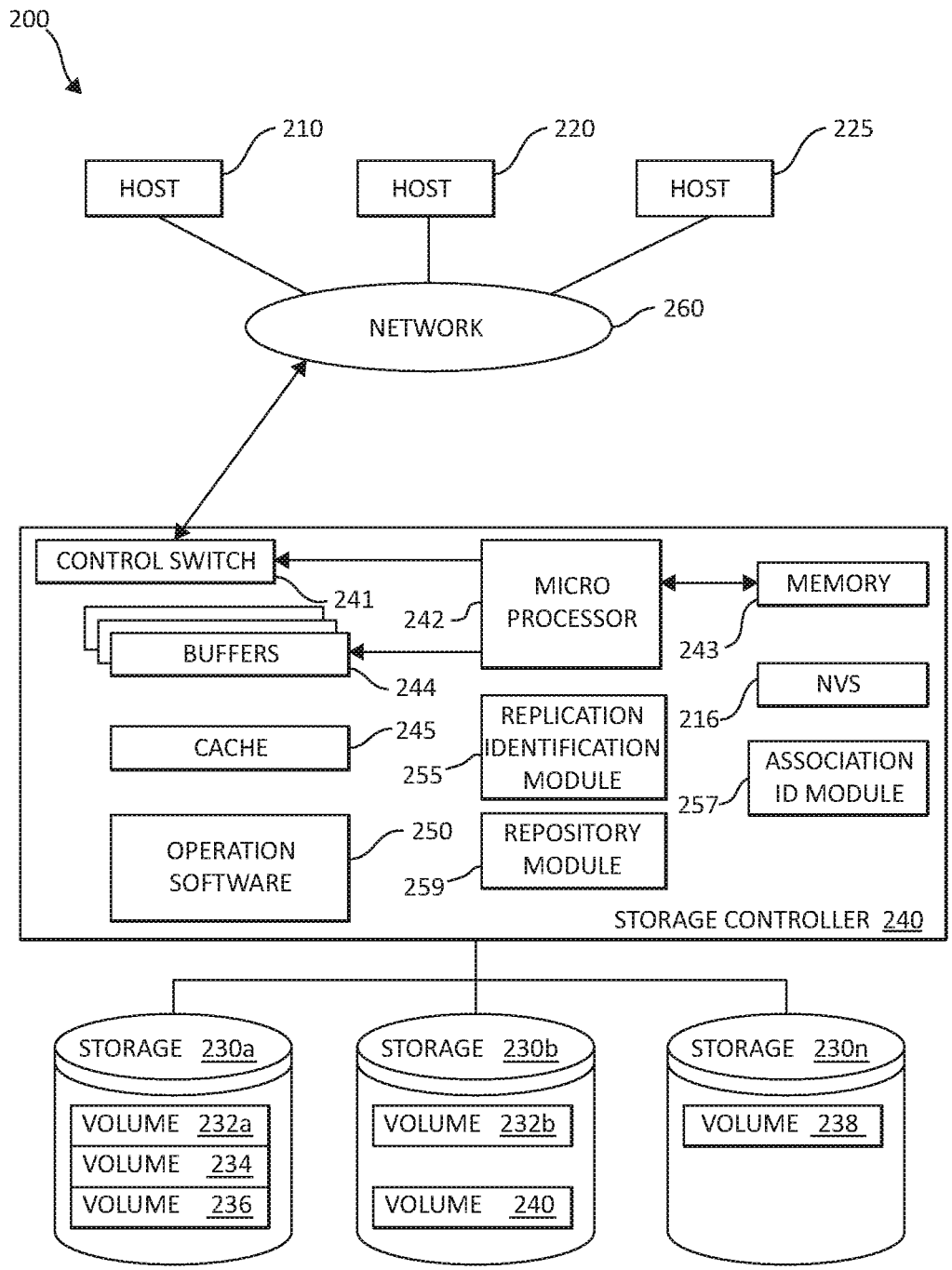
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, a heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a replica identification module 255, association module 257, and a repository module 259. The replica identification module 255, association module 257, and the repository module 259 may work in conjunction with each and every component of the storage controller 240, the hosts 210, 220, 225, and storage devices 230. The replica identification module 255, association module 257, and the repository module 259 may be structurally one complete module or may be associated and/or included with other individual modules. The replica identification module 255, association module 257, and the repository module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, replica identification module 255, association module 257, and the repository module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, replica identification module 255, association module 257, and the repository module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the replica identification module 255, association module 257, and the repository module 259 may also be located in the cache 245 or other components. It should be noted that the RAM module 259 can be compared to short-term memory and the hard disk to the long-term memory. In other words, the RAM module 259 is random access memory. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more replica identification module 255, association module 257, and the repository module 259 maybe used as needed, based upon the storage architecture and users preferences.

The present invention may utilize the components of FIG. 1 and FIG. 2 for replica identification and collision avoidance in the context of a file-system replication, as well as other file-system replication systems (not shown) architectures commonly known in the art. Each repository may distinguish other repository's data structures, files, and/or objects as compared to the repository's own generated data structures, files, and/or objects when a replication operation is performed to other repositories (in a grid environment). In one embodiment, a determination is made as to whether or not each replication is synchronized. The determination is performed without actually verifying the replica's data or structure, and does so without any probabilistic means, whilst remaining independent of the replication procedures, protocol and/or file-system layout, representation and implementation.

It should be noted that for purposes of the illustrated embodiments, a "grid" is defined as a set of repositories whose data entities can be replicated to every other repositories within the grid. A repository may be assigned at any given time to a single grid. Data may be streamed into a repository by way of replication from a remote source repository in the grid, or by any other supported way of receiving incoming data from local sources (e.g. a backup stream).

Second, a node identification (ID) may be associated with a node, which is a file-system object (e.g. directory, file, link etc.). In one embodiment, each newly created node within the file-system in the repository is assigned with an identification value (e.g., the node ID), which is unique in the grid. Such a global, unique file-system node ID is generated by combining unique identification values containing the grid, repository, and the node ID's.

The unique file-system node ID has special traits, which facilitate efficient replica identification in file-system replication. In one embodiment, the unique node ID is enhanced to achieve collision avoidance within the repository. The special traits are illustrated as follows. (1) The unique node ID is independent of the node's physical location in the file-system or the repository, thereby avoiding any constraints on the structure and layout of the file-system where the unique node ID resides. Moreover, the unique node ID is not affected by the data replication implementation. The data blocks composing the node and the data block's associated meta-data are transferred independently of the unique node ID. (2) The unique node ID values are never recycled. Hence the unique node ID generation and management are simple and the possibilities of stale node references are eliminated. (3) The node maintains its own unique node ID throughout its lifetime, from creation to deletion. The unique node ID does not change when the node's data or structure is modified.

In one embodiment, the file-system replication system maintains consistency and synchronization of structure and data by enforcing an ordering operation during a replication procedure. As such, the replication procedures reflect changes in file-system structure at the target repository in the order (or sequence) in which the changes and operations were carried-out in the source repository. Since the file-system replication system maintains an ordered replication of nodes between the source and target repositories, the existence of the unique node ID within a target repository implies that the node is synchronized in between the source and the target repositories.

By tagging each node in the file-system replication system with a unique node ID, together with the ordered replication of nodes between repositories, the file-system replication system achieves efficient synchronization and ensures absolute identity between the original and replication nodes in the source and target repositories (respectively). Moreover, the tagging preserves the traits described previously, and thus do not impair the efficiency, completeness, and/or independence of traits.

File-system replication systems allow for replicating multiple instances of the same node between a source and target repositories pair. For example, replicating the same file (e.g., /xxx/yyy/zzz/file) twice from repository S to repository D, but to different target directories—one instance to /dst1/xxx/yyy/zzz/file and another instance to /dst2/xxx/yyy/zzz/file—means that the unique node ID will not satisfy the local collision avoidance within repository D, as both instances will carry the same ID value "n". The inability to avoid local collision will cause various file-system management problems, such as staling nodes due to deletion of one of the replica instances.

In one example, a unique association is defined and created for the replication of nodes between a source and target repository. The unique association links a node at the target repository with the originating node in the source, and thus the identification and synchronization is sustained. Moreover, the association between the replica node in the target repository with the originating node in the source repository allows for discrimination between multiple instances of the same node in a repository, as each instance belongs to a different and unique association. By assigning each association with a unique association identification (ID) value in the grid, the file-system replication system achieves collision avoidance. Such a unique association identification (ID) is again generated by combining unique identification values of the grid, repository, and the association. It should be noted that the collision avoidance issue does not occur in a regular creation of a node in a file-system local in the repository (e.g. backup of a new file). This is due to the fact that the local file-system uniquely allocates the node ID, and multiple instances of the same node are not created. Collision avoidance is achieved by the requirement to allocate a unique node ID before the creation of the node and the writing of the node's data blocks. On the other hand, in a global and inter-connected environment, the local repository's file-system does not necessarily control the node ID allocation (e.g. a node replication received from a different repository), and thus the newly created association is required.

Note that following the introduction of multiple associations; the mere existence of a node ID within the repository is not sufficient to ensure synchronization, as multiple node instances can exist in the multiple associations that are not sure to carry the same state. However, the existence of a node ID within an association does ensure each of the node instances are synchronized with the original node in the association.

Figure 3:
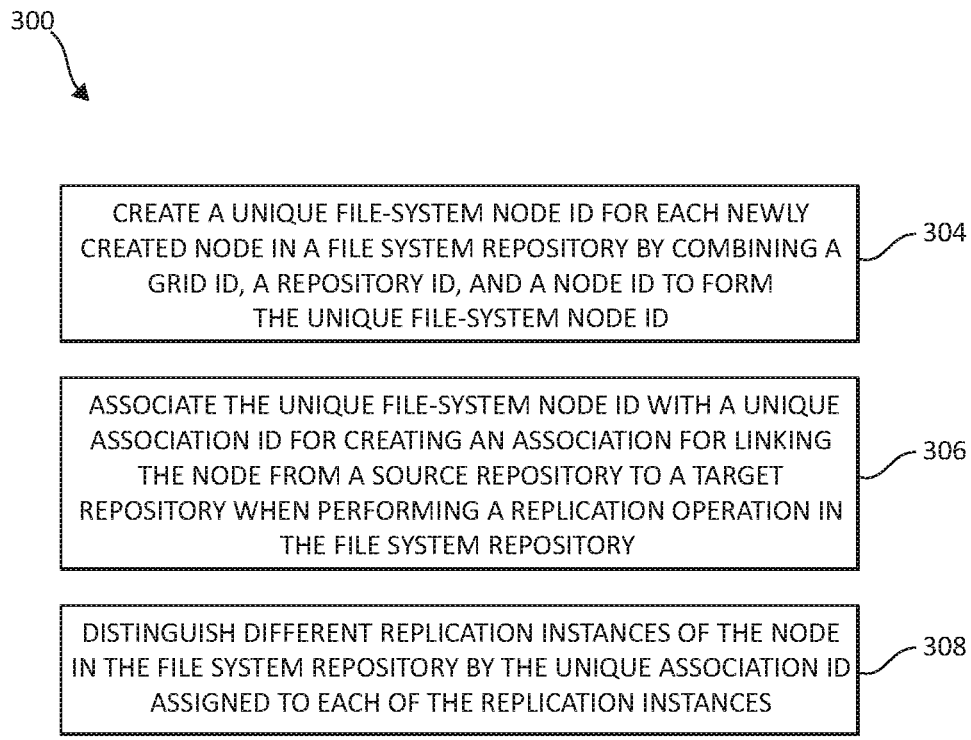
FIG. 3 is a flow chart diagram illustrating an exemplary method for replica identification and collision avoidance in a file system replication.

Turning now to FIG. 3, a flowchart illustrating an exemplary method 300 for replica identification and collision avoidance in a file system replication. The method 300 may create a unique file-system node identification (ID) for each newly created node in a file system repository by combining a grid identification (ID), a repository identification (ID), and a node identification (ID) to form the unique file-system node identification (ID) (step 304). The method 300 may associate the unique file-system node ID with a unique association identification (ID) for creating an association for linking the node from a source repository to a target repository when performing a replication operation in the file system repository (step 306). In other words, the unique association ID allows for a separate and unique association between repositories (e.g., between source repositories and target repositories). Each node may have one or more unique associations. The different replication instances of the node in the target repository are distinguished by the unique association ID assigned to each of the replication instances.

The method 300 may distinguish different replication instances of the node in the file system repository by the unique association ID assigned to each of the replication instances (step 308). It should be noted that each of the steps within method 300 may not be happening consecutively one after the other. In short, each of the steps listed above may act as separate, independent procedures, which happen in the system.

As mentioned earlier, each new file-system node created in a repository is assigned with an identification value that is unique in the grid. Such a unique grid identification (ID) is generated as follows. The unique grid identification (ID) is computed by incrementing the value of the grid ID variable maintained by a software entity, which facilitates generation of grids within the global environment.

A repository is created independently of the grids, and may be subsequently assigned to a grid, and further migrated between grids (at any given time a repository may be associated with a single grid). Upon assignment of the repository to a grid, the repository is assigned with the unique repository identification (ID) computed by incrementing the value of a repository ID variable maintained by a software entity, which corresponds to a grid and facilitates affiliation of repositories to that grid.

Figure 4:
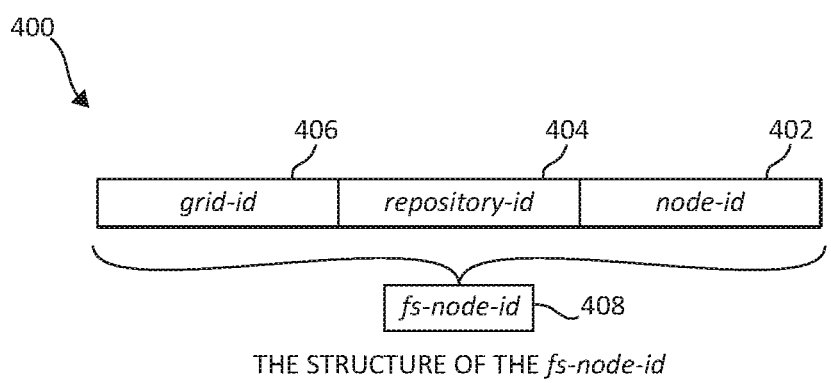
FIG. 4 is a block diagram illustrating an exemplary structure of a unique file-system node identification.

Turning to FIG. 4, a block diagram 400 illustrating an exemplary structure of unique file-system node identification is depicted. A node identification (ID) 402 is computed by incrementing the value of a node ID variable maintained by a software entity, which corresponds to a repository and facilitates allocation of nodes within that repository. A combination of the node ID 402 with the grid ID 406 and a repository ID 404, is defined as a unique file-system node identification (ID) 408 (e.g., also shown by way of example only "fs-node-ID" meaning the unique file-system node identification) of a given node, and serves as the unique identifier of that node in the grid and/or file system. Combined together, the grid ID 406, node ID 402, and the repository ID 404 form the unique file-system node identification (ID) 408.

An association is created within a repository between a source repository and a target repository, and may be subsequently linked with a replication policy, which defines the replication procedure or constraints in the source repository. In other words, an association is a link between a replication policy in a source repository and a single destination target repository of that replication policy. The replication policy will characterize the replication arriving from the source repository in which the policy was configured. The association is assigned with a unique association ID computed by incrementing the value of an association ID variable maintained by a software entity, which corresponds to a repository and facilitates affiliation of new associations to that repository. In one embodiment, by way of example, the association is assigned an fs-node-ID and the association is a directory within the target repository (i.e. an association directory and/or a replication target directory), which will contain the incoming replicated nodes. It should be noted that the replication target directory is one example illustrating a directory for the association within the target repository.

Upon linkage of an association to a replication policy in the source repository, each replicated node is transmitted with the accompanying association ID and thus the replication procedure can determine which replication target directory is to receive the replication node. The values of the fs-node-ID (the unique file-system node identification) and association ID components are never recycled. Therefore, each component representation is defined to be large enough to accommodate continuous processing of a defined time frame. The metadata of the relevant grid is maintained within each associated repository, so that communications may be handled by each repository independently of the software entities and metadata of the grid.

In one example, the following operations are performed for the allocation of an fs-node-ID. When a new file-system node, originating from a locally processed incoming stream of data, is allocated (e.g. a file or directory is created), a new fs-node-ID is also allocated and assigned to that node. However, when a node is received during a replication process, the nodes' fs-node-ID received from the source repository is preserved and used also in the target repository.

The fs-node-ID may also be recorded by performing the following operations. For a node received via a replication process, the fs-node-ID of the node is recorded as received. For a node received via local data processing within a repository, the fs-node-ID node is recorded in the repository such that the node's grid-ID and repository-ID components are set with "special" values. These special values may be predetermined. It should be noted that within a repository, the node-ID component enables unique identification of a node. Upon transmission of such a node to a target repository, the appropriate values of the grid-ID and repository-ID components are added to the node-ID component to form the full fs-node-ID value. This enables easier migration of repositories between grids, since no persistent node level data should be modified when a repository is migrated.

In one example the following operations are performed for allocation, linkage, and removal of an association ID. When a new association is created; a new id is also allocated and assigned to that association. When the association is linked to a single source repository's replication policy, the association ID of the association is recorded in the meta-data of that source repository replication policy. From this point in time, the replication procedure shall transmit the association ID with each replication of a node to the target repository, where the node's identification at the target repository is composed of the node's fs-node-ID (e.g., the unique file-system node identification value) and the node's association ID. Whenever the association is removed, the system may unlink the association ID from the source repository replication policy so as to disable any replication initiation generated from this policy related to the removed association.

The association may be a directory within a target repository receiving incoming replication of nodes. As such, the association has a directory fs-node-ID. However, when the directory is defined to be an association (e.g. a replication target directory), the association/directory is also assigned an association ID. Later, when a linkage occurs between a source repository replication policy and a replication target directory the association ID of that target directory is saved within the replication policy. Subsequent to saving the association ID within the replication policy, any replication process that occurs after the saving operation will transmit the replication target directory ID with each node replication.

Each fs-node-ID is used for identification of node recurrence in the replication processes, consequently saving bandwidth required for replication and storing the nodes in an efficient form (preserved from the source repository without further processing). Each association ID is used to discriminate multiple nodes within a repository after each association ID has been received by an incoming replication. Next, each of the replication processes, and any related processes of the replication, are illustrated below by focusing on the usage of the fs-node-ID and association ID to achieve the previously discussed requirements.

Figure 5:
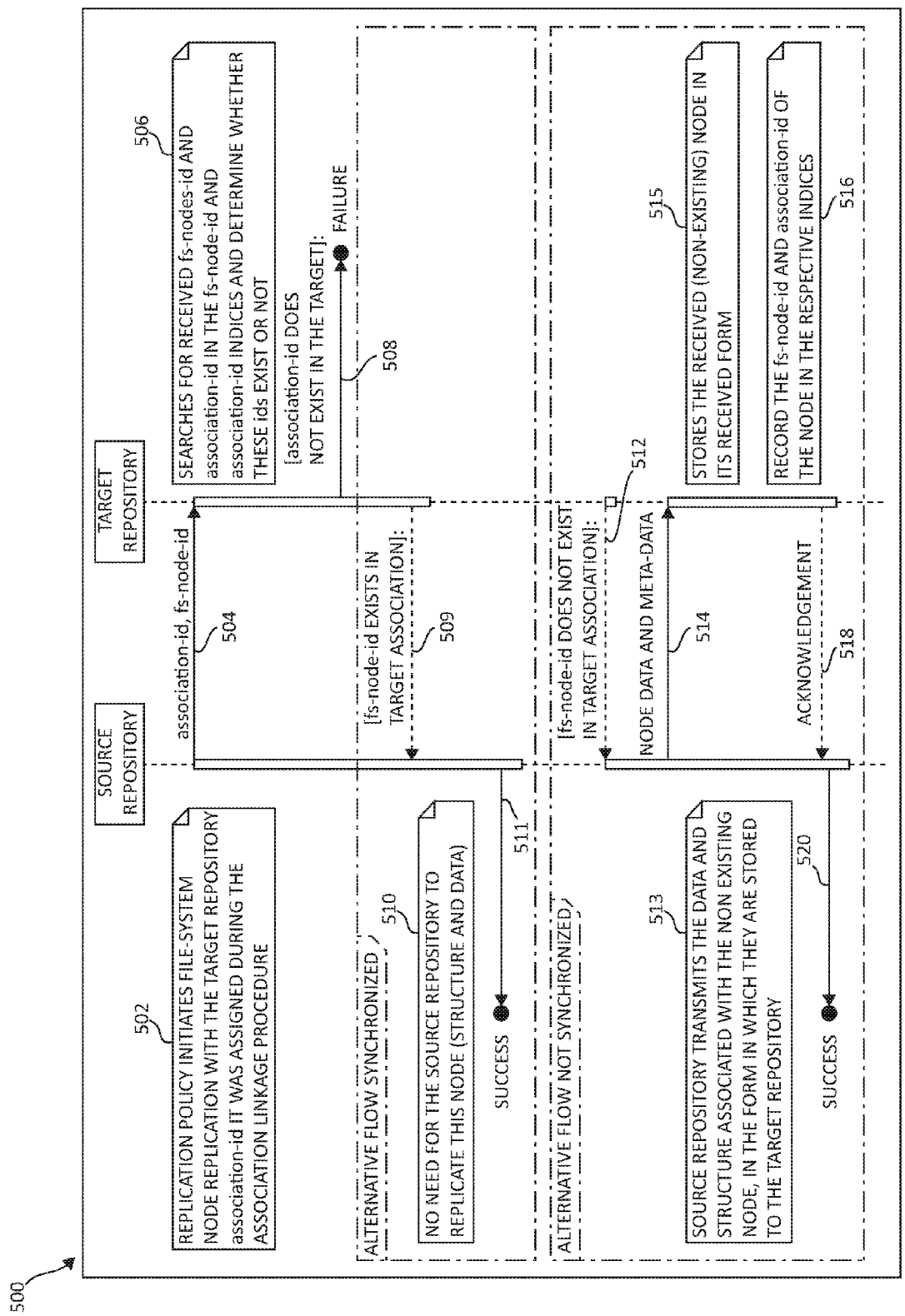
FIG. 5 is a flow chart diagram illustrating an exemplary procedure for replication of a file-system node.

Turning now to FIG. 5, a flow chart diagram 500 illustrating an exemplary procedure for replication of a file-system node is illustrated. In one example, the method 500 for the replication of a file-system node is described as follows. In method 500, a replication policy initiates the file-system node replication with the association ID of the target repository the association ID was assigned during the linkage procedure described previously (step 502). The fs-node-ID and the association ID values of this node are transmitted to the target repository (step 504). The target repository receives the fs-node-ID and the association ID values, and searches locally for existence of the fs-node-ID and the association ID values using an fs-node-ID and association ID indices (e.g. databases), and subsequently determines whether the fs-node-ID and the association ID values exist or not (step 506). If the association ID does not exist in the target repository, then the replication procedure fails (step 508). Otherwise, if the fs-node-ID exists in the target association (step 5090, then the target repository signals the source repository that the node should not be replicated (step 510) and as such, the procedure is completed with success and a notification may be sent for the success (step 511). Terminal state to the procedure. If the fs-node-ID does not exist in the target association (step 512), the source repository transmits the data and meta-data associated with the non existing node, in the form in which they are stored (e.g. compressed and/or deduplicated), to the target repository (step 513). The (non-existing) node and the meta-data are sent to the target repository (step 514). The target repository stores the received (non-existing) node (data and possibly the structure) in the received node's form (preserved from the source repository) (step 515) and records the fs-node-ID and association ID in the respective indices (step 516). After the storing and recording operations, the target repository may send an acknowledgement (step 518) to the source repository for indicating a success (step 520).

In one embodiment, the following sub-procedure may be performed for recording the fs-node-IDs for a locally generated object. A new fs-node-ID is generated for a new node, and stored within the repository together with other relevant meta-data of the node (e.g. path and name). The grid-ID and repository-ID components are set to invalid within the fs-node-ID. The fs-node-ID is recorded in the repository as a mapping between the node path and name to the internal node (which represents the data storage of the file-system node).

In one embodiment, the following operations may be performed for storing a new node within a repository. A new (non-existing) node may be received via a replication process from other repositories or in the context of locally processed incoming data (e.g. file is created). Although fs-node-ID generation for a new node is different between these cases (as specified before), the data of a new node is stored the same in both cases. Generally, a logical storage segment is allocated to accommodate the meta-data of the node as well as its data blocks, and the new node is stored within the allocated storage segment. This logical storage segment may be physically located anywhere in the repository, depending on the repository's internal logic and optimizations. The replication method proposed, therefore, does not apply any constraints on the structure and layout of the target repositories relative to the source repository.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for replica identification and collision avoidance in a file-system replication by using a processor device, comprising:
   creating a unique file-system node identification (ID) by combining a grid identification (ID), a repository identification (ID), and a node identification (ID) for each newly created node in a file system repository;
   associating the unique file-system node ID with a unique association identification (ID) thereby linking the node from a source repository to a target repository to form an association when performing a replication operation between the source repository and the target repository, wherein different replication instances of the node in one of the source repository and the target repository are distinguished by the unique association ID assigned to each of the replication instances, thereby maintaining absolute synchronization between the source repository and the target repository;
   incrementing a value of the grid ID that facilitates generation of at least one of a plurality of grids within a global environment; and
   upon removing the association, unlinking the unique association ID from a replication policy in a source repository, wherein an initiated replication operation is disabled.

2. The method of claim 1, further including performing at least one of:
   incrementing a value of the repository ID that is assigned to one of the source repository and the target repository at the time one of the source repository and the target repository is assigned to the at least one of the plurality of grids and facilitates an affiliation between one of the source repository and the target repository and the at least one of the plurality of grids, and
   incrementing a value of the node ID that corresponds to one of the source repository and the target repository and facilitates allocation of nodes within the file system repository.

3. The method of claim 1, further including linking a replication policy in the source repository to the association in the target repository.

4. The method of claim 3, further including facilitating an affiliation between the replication policy and a new one of the association for incoming replicated nodes to the target repository.

5. The method of claim 1, further including transmitting with the node the unique association ID for determining which one of the association in the target repository to store the node being replicated, wherein the unique association ID is used to differentiate each of the replication instances between one of the source repository and the target repository within the target repository.

6. The method of claim 5, further including preserving the unique file-system node ID of the node in the target repository.

7. The method of claim 6, further including recording the unique association ID in meta data of a replication policy in the source repository.

8. A system for replica identification and collision avoidance in a file-system replication in a computing environment, comprising:
   a processor device operable in the computing environment, wherein the processor device performs each of:
      creating a unique file-system node identification (ID) by combining a grid identification (ID), a repository identification (ID), and a node identification (ID) for each newly created node in a file system repository,
      associating the unique file-system node ID with a unique association identification (ID) thereby linking the node from a source repository to a target repository to form an association when performing a replication operation between the source repository and the target repository, wherein different replication instances of the node in one of the source repository and the target repository are distinguished by the unique association ID assigned to each of the replication instances, thereby maintaining absolute synchronization between the source repository and the target repository,
      incrementing a value of the grid ID that facilitates generation of at least one of a plurality of grids within a global environment, and
      unlinking the unique association ID from a replication policy in a source repository, wherein an initiated replication operation is disabled.

9. The system of claim 8, wherein the at least one processor performs at least one of:
   incrementing a value of the repository ID that is assigned to one of the source repository and the target repository at the time one of the source repository and the target repository is assigned to the at least one of the plurality of grids and facilitates an affiliation between one of the source repository and the target repository and the at least one of the plurality of grids, and
   incrementing a value of the node ID that corresponds to one of the source repository and the target repository and facilitates allocation of nodes between one of the source repository and the target repository.

10. The system of claim 8, wherein the at least one processor device links a replication policy in the source repository to the association in the target repository.

11. The system of claim 10, wherein the at least one processor device facilitates an affiliation between the replication policy and a new one of the association for incoming replicated nodes to the target repository.

12. The system of claim 8, wherein the at least one processor device transmits with the node the unique association ID for determining which one of the association in the target repository to store the node being replicated, wherein the unique association ID is used to differentiate each of the replication instances between one of the source repository and the target repository within the target repository.

13. The system of claim 12, wherein the at least one processor device preserves the unique file-system node ID of the node in the target repository.

14. The system of claim 13, wherein the at least one processor device records the unique association ID in meta data of a replication policy in the source repository.

15. A computer program product for replica identification and collision avoidance in a file-system replication in a computing environment using a processor device, the computer program product comprising a non-transitory computer-readable storage medium having computer-readable program code portions stored therein, the computer-readable program code portions comprising:

an executable portion for creating a unique file-system node identification (ID) by combining a grid identification (ID), a repository identification (ID), and a node identification (ID) for each newly created node in a file system repository;

an executable portion for associating the unique file-system node ID with a unique association identification (ID) thereby linking the node from a source repository to a target repository to form an association when performing a replication operation between the source repository and the target repository, wherein different replication instances of the node in one of the source repository and the target repository are distinguished by the unique association ID assigned to each of the replication instances, thereby maintaining absolute synchronization between the source repository and the target repository;

an executable portion for incrementing a value of the grid ID that facilitates generation of at least one of a plurality of grids within a global environment; and an executable portion for unlinking the unique association ID from a replication policy in a source repository, wherein an initiated replication operation is disabled.

16. The computer program product of claim 15, further including an executable portion for performing at least one of:

incrementing a value of the repository ID that is assigned to one of the source repository and the target repository at the time one of the source repository and the target repository is assigned to the at least one of the plurality of grids and facilitates an affiliation between one of the source repository and the target repository and the at least one of the plurality of grids, and incrementing a value of the node ID that corresponds to one of the source repository and the target repository and facilitates allocation of nodes within the file system repository.

17. The computer program product of claim 15, further including an executable portion for linking a replication policy in the source repository to the association in the target repository.

18. The computer program product of claim 17, further including an executable portion facilitating an affiliation between the replication policy and a new one of the association for incoming replicated nodes to the target repository.

19. The computer program product of claim 15, further including an executable portion for transmitting with the node the unique association ID for determining which one of the association in the target repository to store the node being replicated, wherein the unique association ID is used to differentiate each of the replication instances between one of the source repository and the target repository within the target repository.

20. The computer program product of claim 19, further including an executable portion for preserving the unique file-system node ID of the node in the target repository.

21. The computer program product of claim 20, further including an executable portion for recording the unique association ID in meta data of a replication policy in the source repository.

* * * * *